United States Patent [19]

Brockhaus

[11] Patent Number: 4,763,454
[45] Date of Patent: Aug. 16, 1988

[54] PROTECTIVE DEVICE FOR WINDOW PANES

[75] Inventor: Ernst Brockhaus, Remscheid-Hasten, Fed. Rep. of Germany

[73] Assignee: ED. Scharwächter GmbH & Co. KG., Fed. Rep. of Germany

[21] Appl. No.: 99,065

[22] Filed: Sep. 21, 1987

[30] Foreign Application Priority Data

Sep. 22, 1986 [DE] Fed. Rep. of Germany ....... 3632148

[51] Int. Cl.⁴ .............................................. E06B 3/26
[52] U.S. Cl. ..................... 52/202; 160/354; 160/370.2; 296/95 C; 428/38
[58] Field of Search ............... 52/202, 203; 160/354, 160/368 S; 296/95 C, 107; 428/38, 81, 83, 102, 192

[56] References Cited

U.S. PATENT DOCUMENTS

| | | | |
|---|---|---|---|
| 1,605,056 | 11/1926 | Newman | 428/38 |
| 2,144,513 | 1/1939 | Smith | 428/192 |
| 2,966,436 | 12/1960 | Fox et al. | 428/38 |
| 3,670,798 | 6/1972 | Hess et al. | 160/354 |
| 3,751,100 | 8/1973 | Keyes | 296/95 C |
| 4,182,088 | 1/1980 | Ball | 52/202 |

FOREIGN PATENT DOCUMENTS 376009 4/1964 Switzerland ...................... 296/95 C Primary Examiner—James L. Ridgill, Jr.
Attorney, Agent, or Firm—Toren, McGeady & Associates

[57] ABSTRACT

A protective device for window panes which are susceptible to scratching, particularly the window panes in folding convertible tops of vehicles. The pane is at its circumference welded into an envelope of covering material which forms a window frame. The covering material is sewed together with the window panel. During the manufacture and assembly of the convertible top, the window pane is provided with the cover of a material which is mechanically weak but soft and neutral relative to the pane material and of a foil having a high mechanical strength. The protective cover is sewed together with the window pane and the envelope of covering material. For an easy removal of the edge regions, the protective cover is provided with toothlike or interrupted edge portions.

16 Claims, 4 Drawing Sheets

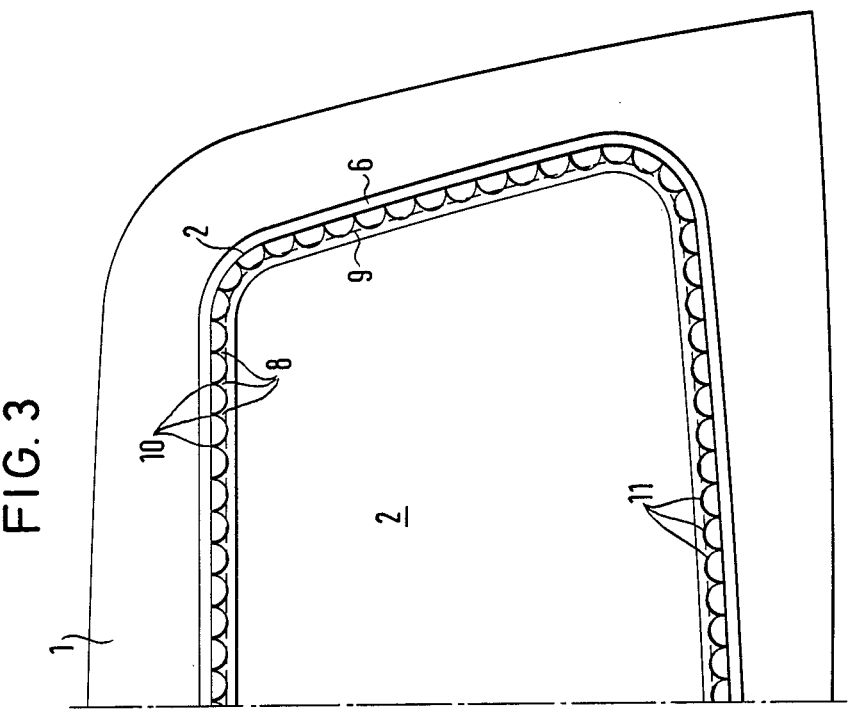
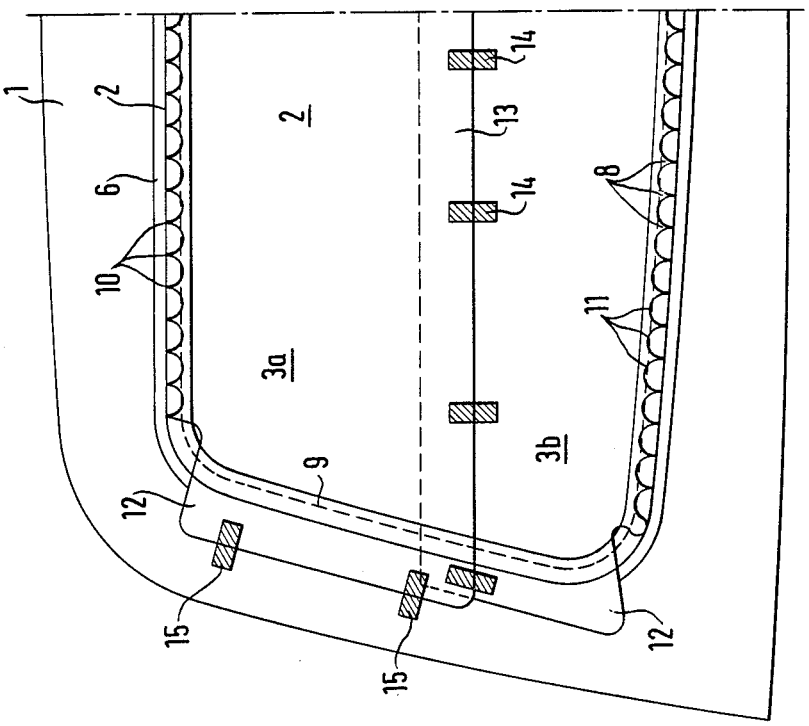

PROTECTIVE DEVICE FOR WINDOW PANES

BACKGROUND OF THE INVENTION

1. Field of the Invention

The present invention relates to a protective device for window panes which are susceptible to scratching, particularly the rear window panes in folding convertible tops. The pane is at its circumference welded into an envelope of covering material which forms a window frame. In addition, the covering material is sewed together with the window pane. During the manufacture and assembly of the convertible top, the window pane is provided with a cover of a material which is mechanically weak but soft and neutral relative to the pane material, for example, a non-woven fabric, and of a foil having a high mechanical strength.

2. Description of the Prior Art

Window panes in motor vehicles must meet a variety of requirements which are in part contradictory. This is particularly true in so-called safety panes, especially in rear window panes of folding convertible tops. These window panes must have good optical properties in order to ensure a clear and distortion-free view. Also, the panes must have sufficient stiffness, so that they assume a non-wavy shape when in the tensioned state, i.e., when the convertible top is closed. On the other hand, the panes must have sufficient flexibility, so that, since they are integrated into the top of the convertible, they can follow the folding procedure of the top when the top is opened, without suffering buckling or permanent deformations.

Therefore, the window panes used in rear windows of folding convertible tops are made of a plastics material which has excellent optical properties, particularly affording a clear view, and, on the other hand, has sufficient flexibility in order to follow the folding process during opening of the top. However, the materials known and available for the manufacture of such window panes have the disadvantage that they are extremely susceptible to scratching, so that the danger exists, that the panes are damaged already during the manufacturing and assembling process of the convertible top and, thus, the optical properties and particularly the clear view are significantly impaired.

In addition, the materials known and used in the manufacture of window panes and particularly of rear window panes in convertible tops are extremely sensitive with respect to adhesives, so that it is not possible to glue a protective cover onto the window pane for protecting the pane during the manufacturing and assembling procedure of the convertible top.

In order to avoid the above-described difficulties resulting from the properties of the materials used for the manufacture of window panes in convertible tops, the window panes in convertible tops have in the past been covered on both sides by means of a cover of a soft material which is neutral with respect to the material of the window pane, particularly a non-woven fabric, and of an additional foil of tear-resistant material. This cover was fastened by means of adhesive tape to the material of the convertible top at the circumferential edge of the window pane. Of course, this solution, which requires the application of two different cover materials one on top of the other and gluing the cover materials by means of special adhesive tape to the material of the convertible top, is expensive with respect to material and labor. This increases the manufacturing costs of the convertible top.

It is, therefore, the primary object of the present invention to provide a protective device for a window pane of a convertible top, particularly the rear window, which is inexpensive and safe to manufacture.

It is another object of the present invention to provide a protective device which makes it possible to protect a window pane, particularly a rear window pane of a convertible top, against all types of damage until the vehicle is delivered, without foregoing the possibility of checking the window pane as it is delivered to the vehicle manufacturer.

SUMMARY OF THE INVENTION

In accordance with the present invention, the protective cover is sewed together with the window pane and the envelope of the covering material. In addition, for an easier removal of the edge regions, the protective cover is provided with tooth-like or interrupted edge portions.

A protective cover of this type for window panes susceptible to scratching can be sewed to the window pane together with the envelope of covering material forming the window pane frame without requiring an additional work step. Moreover, the protective cover protecting the window pane can be totally or partially removed at any time during or after the manufacture and the assembly of the convertible top. Advantageously, the protective cover is simply torn away. If those portions at the circumference of the protective cover which are sewed to the window pane and the envelope forming the window pane frame are suitably shaped, the protective cover can be torn away without leaving visible residues or residues which must later be laboriously removed.

In accordance with a feature of the invention, the protective cover is provided along at least one or two of the longitudinal circumferential edges of the pane with prong-like projections which project beyond the surface area of the pane. The prong-like projections are sewed between the pane and the envelope forming the window pane frame, so that the protective cover can be easily torn away without leaving visible residues. The prong-like projections have profile shapes which end in points at the free ends thereof. Between the points, the profile shapes are at least partially circular. Of course, in order to ensure a complete covering of the pane to be protected, the partially circular portions are arranged so as to extend beyond the surface area of the window pane. The partially circular shape of the portions between adjacent prong-like projections of the cover has been found particularly advantageous because undesirable transverse tears are avoided when the cover is removed.

In accordance with another particularly preferred embodiment of the invention, the cover may be composed of two overlapping pieces which, at least along their respective free longitudinal edges, are provided with flaps or prongs which extend beyond the surface area of the pane and are sewed to the pane and the window pane frame formed by an envelope of the covering material. The sewing extends merely over at least the two parallel longitudinal edges of the pane. It is advantageous if at least one of the two cover pieces is provided at least along a narrow edge of the surface area of the pane with a loose flap which extends beyond the pane and forms a handle. Thus, the cover piece provided with this flap can be easily lifted from the pane in order to check the pane.

In accordance with another advantageous feature of the invention, the two cover pieces are connected to each other in the area where they overlap each other. The pieces are connected by means of adhesive material portions, such as adhesive tapes. As a result, the cover pieces can be repeatedly separated from each other and then again connected to each other.

In accordance with another feature of the invention, the cover may have at least along its two longitudinal edges a plurality of flaps which are arranged spaced apart from each other and project beyond the surface area of the pane. The cover is sewed together with the window pane frame and the pane. As a result, it is ensured that the cover covers the entire surface area of the pane and prevents damage to the edge portions of the pane. In addition, the cover can be torn away without visible residue as soon as the convertible top or the vehicle has been fully assembled. The flaps of the cover projecting beyond the surface area of the pane are advantageously arranged spaced apart from each other at a distance which is a multiple of the longitudinal dimension of the flaps. Of course, in addition to being arranged at the longitudinal sides of the pane, these flaps can also be arranged more or less uniformly distributed over the entire circumference of the pane.

In accordance with another advantageous embodiment of the invention, the cover is sewed to the envelope of the covering material forming the window pane frame and to the pane with the cover being placed on the envelope. In this case, the cover has prong-like projections in its edge regions. The seam connecting the pane and the window pane frame extends through these prong-like projections. Prong-like projections are arranged at a distance from each other which corresponds to a multiple of the width of each prong-like projection. The cover may be sewed to the pane and the window pane frame only along one of the circumferential edges of the pane. On the three remaining circumferential edges of the pane, the cover may extend beyond the surface area of the pane by at least the width of the window pane frame, wherein the portions extending over the window pane frame are loosely placed on the window pane frame.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 3 is a partial schematic rear elevational view of another embodiment of the cover according to the present invention placed on the rear window of a convertible top;

FIG. 5 is a partial schematic rear elevational view of another embodiment of a cover for the rear window of a convertible top according to the present invention.

DETAILED DESCRIPTION OF THE INVENTION

Figure 1:
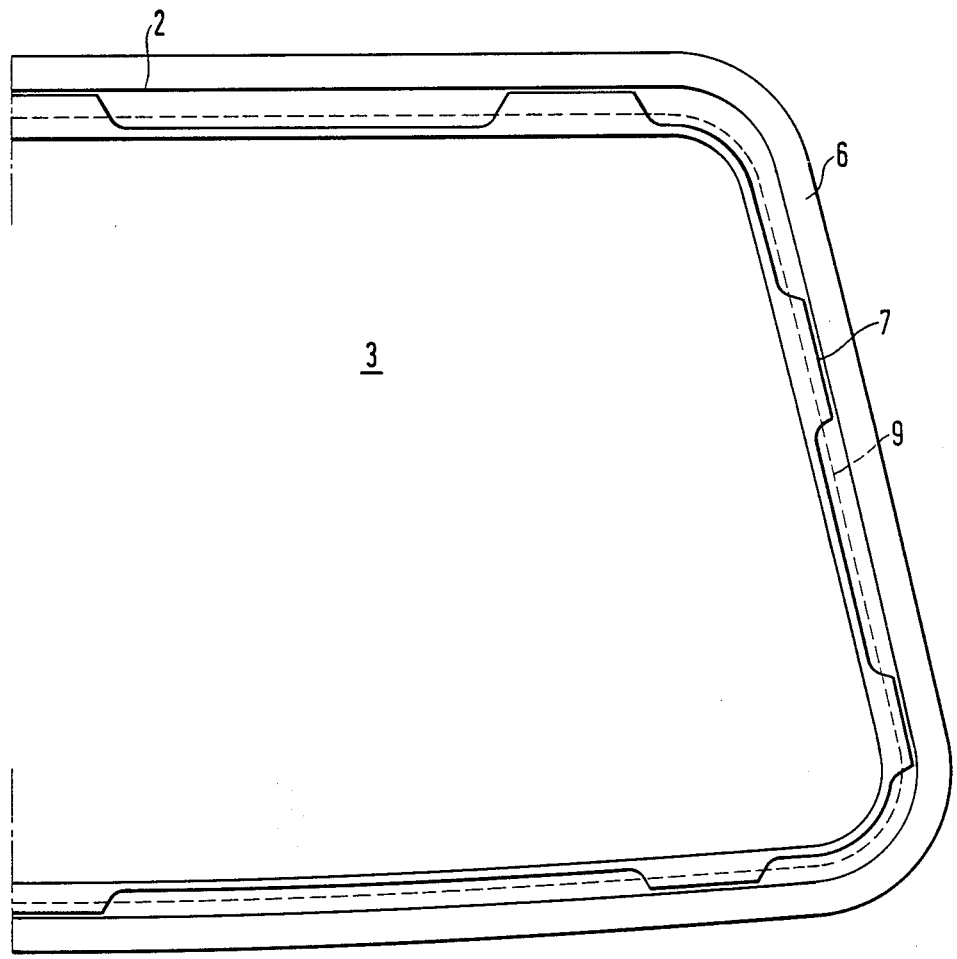
FIG. 1 is a partial schematic rear elevational view of a rear window of a convertible top provided with a cover according to the present invention.

As illustrated in the drawings, a window pane 2 is arranged in the region of the rear wall of a convertible top 1. The window pane 2 is made of a plastics material which is not scratch-resistant, but is flexible and sufficiently stiff. In the illustrated embodiment, during the manufacture and assembly procedure of the convertible top 1, the window pane 2 is covered on both sides by a protective cover 3.

Protective cover 3 is composed of a foil having a high mechanical strength and a non-woven fabric 5 laminated to the foil. The material of fabric 5 has a low mechanical strength but is neutral relative to the material of the window pane, so that the optical properties of the window pane 2 cannot be impaired by the influence of hot or cold temperatures or by mechanical contact.

Figure 2:
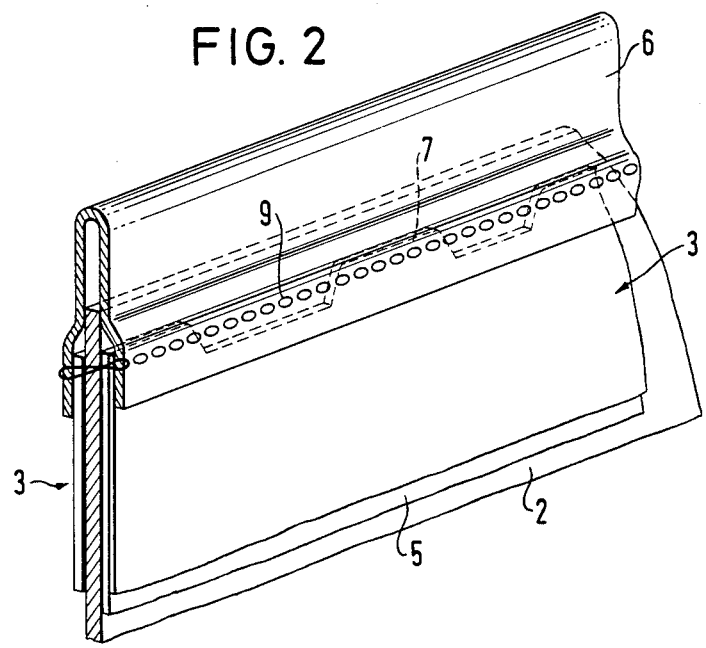
FIG. 2 is a perspective view of a detail of FIG. 1 on a larger scale.

As particularly illustrated in FIG. 2, the window pane 2 is covered on both sides by a cover 3 each. Both covers 3 are sewed together with the window pane 2 and an envelope of covering material forming a window pane frame 6. The window pane frame 6 is connected to the window pane 2 along a border region thereof by welding and additionally by a seam 9. Seam 9 extends through window pane frame 6, window pane 2 and the two covers 3. The covers 3 are provided with flaps 7 or prong-like projections 8 which extend beyond the surface area of the window pane 2. The covers 3 are sewed at these flaps 7 or prong-like sections 8 by means of the seam to the window pane 2 and the window pane frame 6.

In the embodiment illustrated in FIGS. 1 and 2, the covers 3 have portions or flaps 7 which extend beyond the surface area of the window pane 2, wherein these flaps 7 are arranged at a distance from each other which corresponds to a multiple of the length of each flap. These flaps are sewed to the window pane 2 as well as to the window pane frame 6. As a result, it is possible to remove the covers 3 by simply tearing them away from the window pane 2 without leaving a visible residue in the entire surface area of the window pane 2 because a seam 9 connecting the window pane 2, the window pane frame 6 and the covers 3 is arranged a certain distance outside of the surface area of the window pane 2 through which a view is provided. It should be emphasized that the transitions between the flaps 7 of cover 3 and the portions extending beyond the surface area of the window pane 2 are arc-shaped, so that, when cover 3 is torn away, it is not possible that tears are formed which extend perpendicularly or at an acute angle relative to the seam 90. This, in turn, makes it possible to remove the cover 3 without leaving residues which extend into the surface area of the window pane 2 through which a view is provided.

Figure 4:
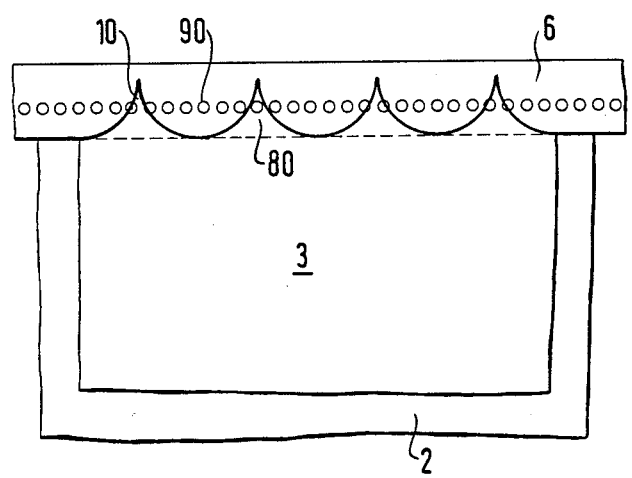
FIG. 4 is a partial illustration of a prong-like circumferential profile of a cover for the rear window of a convertible top according to the present invention.

FIGS. 3 and 4 of the drawing show an particularly advantageous embodiment of the invention. Cover 3 has prong-like projections which extend beyond the surface area of window pane 2. These prong-like projections 8 end in points at their free ends 10, while adjacent projections are connected through at least partially circular portions. These partially circular portions lead into the points of the prong-like projections.

As is clear from the illustrations of FIG. 1 as well as of FIGS. 2 and 3, the flap-like projections 7 or prong-like projections 8 of the cover 3 are arranged in such a way that they are located outside of the surface area of the window pane. Thus, the window pane is protected over its entire surface against damaging influences as long as it is covered by the protective covers.

In the embodiment illustrated in FIG. 5, the covers 3 are sewed to the pane 2 and to the window pane frame 6 along the upper and lower edges of the pane, while the covers 3 have flaps 12 forming gripping flaps at the side edges of the pane 2, wherein the flaps 12 extend beyond the surface area of the pane 2. Each cover 3 is divided into two cover portions 3a and 3b which overlap each other in the region indicated by reference numeral 13. The two cover portions 3a and 3b of cover 3 are connected to each other in the region 13 by means of adhesive tapes 14. Thus, it is possible to lift one and-/or the other cover portion of cover 3, for example, for the purpose of a quality inspection of the window pane 2. As additionally illustrated in FIG. 5, flaps 12 can be connected to the covering material of the convertible top 1 by means of adhesive tapes 15.

Figure 6:
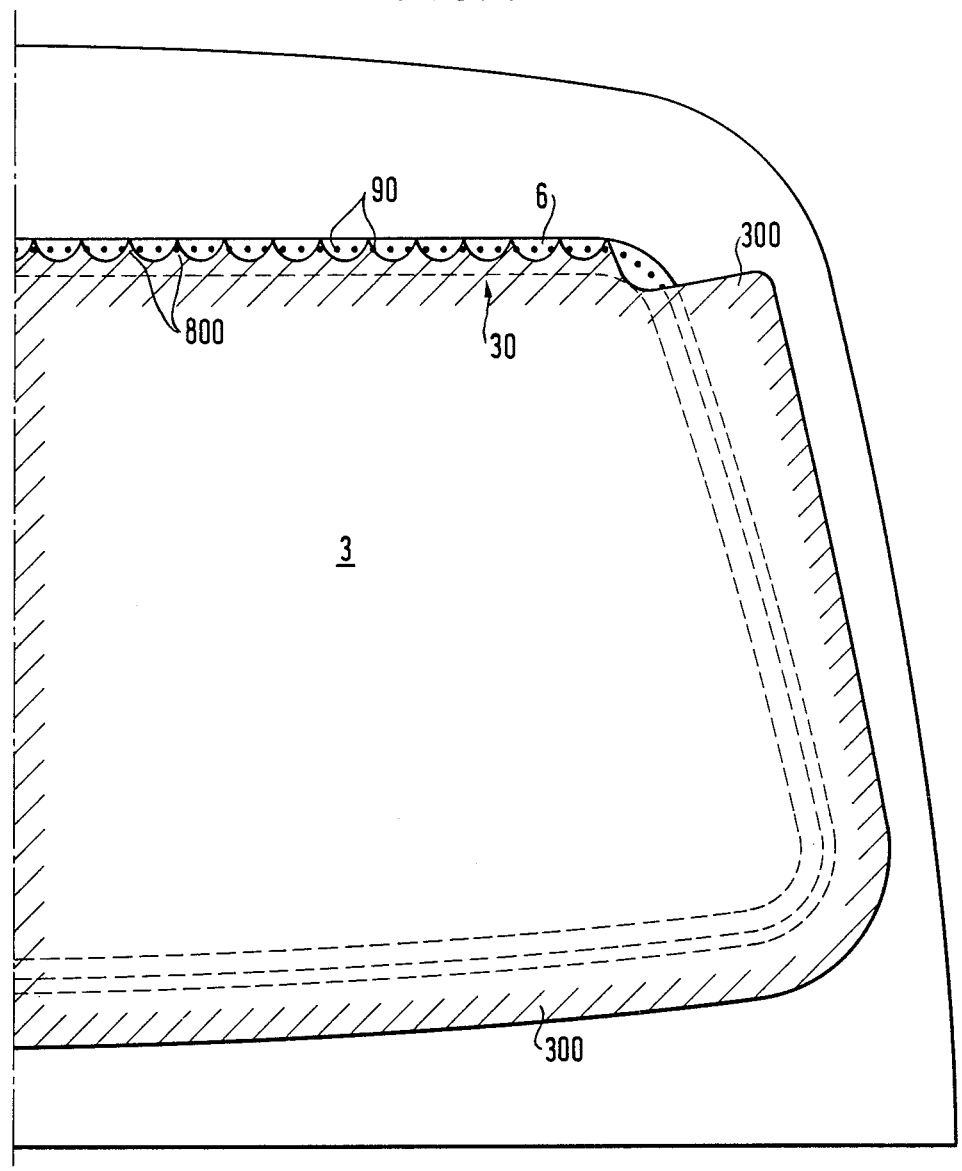
FIG. 6 is a partial schematic rear elevational view of yet another embodiment of a cover for the rear window of a convertible top according to the present invention.

In the embodiment illustrated in FIG. 6, cover 3 is placed on the window pane frame 6 and is sewed together with this window pane frame 6 and pane 2 in such a way that seam 90 extends only through prong-like projections 800 arranged at the edge 30 of cover 3. These projections 800 essentially correspond in their shape to those illustrated in FIG. 4. As illustrated in FIG. 6, cover 3 is sewed to the window panes 6 and the pane 2 only along the upper window pane frame. Along the three remaining edges of the pane, the cover 3 extends beyond the pane by at least the width of the window pane frame 6, as indicated by reference numeral 300. In these areas 300, cover 3 is placed loosely on window pane 6.

While specific embodiments of the invention have been shown and described in detail to illustrate the application of the inventive principles, it will be understood that the invention may be embodied otherwise without departing from such principles.

I claim:

1. A protective device for window panes which are susceptible to scratching, such as rear window panes in folding convertible tops, the pane being at its circumference welded to an envelope of covering material forming a window frame, the covering material being sewed together with the window pane, a protective cover placed on the window plane, the protective cover being of a material which is mechanically weak but soft and neutral relative to the pane material and of a foil having a high mechanical strength, wherein the improvement comprises that the protective has at its edges projecting portions, and that the projection portions are sewed together with the pane and the window pane frame.

2. The protective device according to claim 1, wherein the cover, the window pane frame and the pane are sewed together by means of a seam, the seam being arranged spaced from the circumferential edges of the cover, the window pane frame and the pane and outside of the surface area of the pane providing a view therethrough.

3. The protective device according to claim 1, wherein the neutral material is a non-woven fabric.

4. The protective device according to claim 1, wherein the projecting portions are tooth-shaped.

5. The protective device according to claim 1, wherein the projecting portions are prong-shaped, the projecting portions projecting beyond the surface area of the pane, the projecting portions being provided along at least two circumferential edges of the protective cover.

6. The protective device according to claim 5, wherein the prong-like projections have profile shapes which end in points at the free ends thereof, and the profile shapes between the points are at least partially circular, the partially circular portions being arranged so as to extend beyond the surface area of the window pane.

7. The protective device according to claim 1, wherein the projecting portions are in the form of flaps.

8. The protective device according to claim 7, wherein the flaps are arranged over the entire circumference of the window pane.

9. The protective device according to claim 7, wherein the flaps are arranged spaced apart from each other and along at least the two longitudinal edges of the surface area of the pane.

10. The protective device according to claim 9, wherein the spacing between the flaps is a multiple of the longitudinal extension of the flaps.

11. The protective device according to claim 1, wherein the cover includes two overlapping cover portions, the cover portions being provided with the projecting portions along at least their longitudinal edges, the projecting portions projecting beyond the surface area of the window pane.

12. The protective device according to claim 11, wherein at least one of the two cover portions has at least along a narrow edge of the surface area of the pane a loose flap which extends beyond the pane and forms a handle.

13. The protective device according to claim 11, wherein the two cover portions are connected to each other in the area where they overlap each other by means of adhesive material portions, such that they can be temporarily and repeatedly separated from each other and connected to each other.

14. The protective device according to claim 13, wherein the adhesive material portions are adhesive tapes.

15. A protective device for window panes which are susceptible to scratching, such as rear window panes in folding convertible tops, the pane being at its circumference welded to an envelope of covering material forming a window frame, the covering material being sewed together with the window pane, a protective cover placed on the window pane, the protective cover being of a material which is mechanically weak but soft and neutral relative to the pane material and of a foil having a high mechanical strength, wherein the improvement comprises that the cover is provided with prong-shaped projections beyond the edges of the cover, the projection being sewed to the pane and the window pane frame with the projections places on the window pane frame.

16. The protective device according to claim 15, wherein the projections are provided only over one longitudinal edge of the surface area of the window pane, the cover forming at the remaining free edges portions which are loosely placed on the window pane frame and project over the surface area of the window pane at least by the width of the window pane frame.

* * * * *